United States Patent
Carmon et al.

(10) Patent No.: US 8,752,959 B2
(45) Date of Patent: Jun. 17, 2014

(54) METHOD AND SYSTEM FOR DESIGNING OPTHALMIC LENSES

(75) Inventors: Yuval Carmon, Tivon (IL); Zohar Katzman, Haifa (IL)

(73) Assignee: Shamir Optical Industry Ltd., Kibbutz Shamir (IL)

( * ) Notice: Subject to any disclaimer, the term of this patent is extended or adjusted under 35 U.S.C. 154(b) by 57 days.

(21) Appl. No.: 12/835,194

(22) Filed: Jul. 13, 2010

(65) Prior Publication Data

US 2012/0013847 A1 Jan. 19, 2012

(51) Int. Cl.
*G02C 7/02* (2006.01)
*G02C 7/10* (2006.01)

(52) U.S. Cl.
CPC ............... *G02C 7/028* (2013.01); *G02C 7/025* (2013.01); *G02C 7/104* (2013.01)
USPC ..................................................... 351/159.75

(58) Field of Classification Search
CPC ........ G02C 7/024; G02C 7/025; G02C 7/028; G02C 7/104
USPC ........ 351/162–163, 159.74–159.76; 623/6.17
See application file for complete search history.

(56) References Cited

U.S. PATENT DOCUMENTS

| | | | |
|---|---|---|---|
| 5,585,968 A * | 12/1996 | Guhman et al. | 359/654 |
| 5,864,436 A | 1/1999 | Noyes | |
| 7,086,928 B2 | 8/2006 | Siders et al. | |
| 7,182,976 B2 * | 2/2007 | Takahashi et al. | 427/164 |
| 7,677,725 B2 * | 3/2010 | Piers et al. | 351/177 |

OTHER PUBLICATIONS

International Search Report of Application No. PCT/IL11/00556 mailed on Dec. 19, 2011.

* cited by examiner

*Primary Examiner* — Zachary Wilkes
(74) *Attorney, Agent, or Firm* — Pearl Cohen Zedek Latzer Baratz LLP

(57) ABSTRACT

A method for designing ophthalmic lenses, the method comprising calculating an effective refraction index of a lens based on a unique transmission spectrum created by at least one factor related to parameters of at least one of the lens and wavelength dependency of the index of refraction of the lens material, calculating a topography of the lens to achieve a required optical power, based on the calculated effective index of refraction and producing the lens with the calculated topography.

17 Claims, 5 Drawing Sheets

METHOD AND SYSTEM FOR DESIGNING OPTHALMIC LENSES

BACKGROUND OF THE INVENTION

It is a well known fact that all non-opaque materials have a wavelength dependent index of refraction. Additionally, every material has a characteristic dispersion, which is the variation of the refractive index with wavelength. The index of refraction may therefore be denoted n(λ), where n is the index of refraction and is a pure number and λ is the wave length and is measured in units of length. FIG. 1 shows the wavelength dependency of the index of refraction in polycarbonate, which is a popular material for spectacles lenses.

For calculations of optical powers in spectacles lenses, professionals usually use a refraction index which correlates to a wavelength of about 585 nm. In the electromagnetic spectrum, this wavelength corresponds to the yellow color emitted by sodium. This usual refraction index may be denoted n*=n(585). For polycarbonate, n* has a value of about 1.585.

In most cases when a lens is to be processed for a certain prescription, one of surfaces is already in its finished topography and no surface processing needs to be applied on it (usually this is the front surface) and the other surface needs to be milled ground or lathed to a new topography so that at the end of the process the two surfaces combined give optics that fit the patient's Rx (prescription). There are many ways for calculating the back surface topography of the lens to fit the Rx. The simplest approximation is called the thin lens approximation or Lensmaker's equation:

$$\frac{1}{r_b} = \frac{(n^* - 1)\frac{1}{r_f} - \frac{1}{f}}{n^* - 1} \quad \text{Equation 1}$$

where n* is the refraction index of yellow light (585 nm), f is the required focal length of the lens (given by the Rx prescription), $r_b$ is the radius of curvature of the back surface of the lens and $r_f$ is the radius of curvature of the front surface. Equation 1 provides the back surface radius that fits an Rx given the radius of a spherical front surface and the required focal length according to the Rx, assuming the lens is negligibly thin. A further constraint is that the lens optics is paraxial. For example, if the lens is strongly tilted or has a strong prism, other and usually more complicated models have to be used. If one wants to design a progressive lens having a power distribution and a residual cylinder distribution, one would have to employ optimization algorithms. Substantially all of these methods use the index of refraction as a parameter in their calculations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
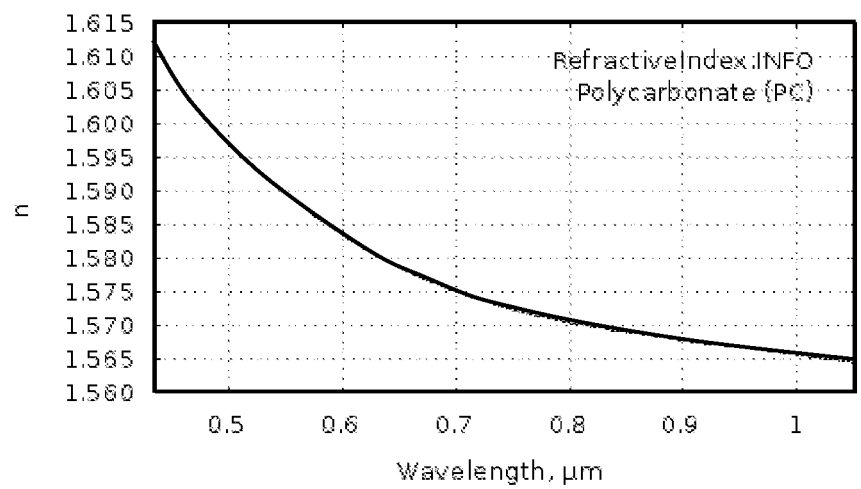
FIG. 1 is a graph illustration of the wavelength dependency of the index of refraction in polycarbonate.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Substantially all the methods for calculating the required lens topography for a certain prescription use the index of refraction as a parameter in their calculations. Therefore, the refraction index affects the final topography of the lens that will finally be processed for the patient's Rx. Accordingly, since usually the refraction index being used by professionals for these calculations is n*=n(585), which corresponds to yellow light, the outcome spectacle lenses may have optimal optics especially, for example, for objects that are yellow and/or illuminated by yellow light and/or, for example, for spectacle lenses which are tinted in yellow. These spectacle lenses, however, may have inaccurate optical power for other wavelengths.

In some cases, this deviation from the accurate required optical power value may be significant. In some cases, this deviation may reach values of 0.1 diopters or more. For example, if the lenses are tinted in blue or blocks most of the yellow light by yellow mirror coating, or if the viewed environment is dominantly blue and/or illuminated by blue light, the effective refraction index of the lens may be significantly different than n*. Since the topography of the lens is usually calculated based on n* in order to provide a required optical power, the differences between the actual effective refractive index and n* may lead to an actual optical power of the lens which is different from the required optical power. The difference may be greater as the optical power is greater and/or as the dispersion of the material of which the lens is made is greater.

For example, in a certain case, an optical power of 5.86 diopters should be provided by a certain topography calculated based of n*=1.586. However, if the effective refraction index according to the light spectrum to be viewed is, for example, 1.596, the actual optical power provided may be 5.96 diopters. This is a difference of 0.1 diopters.

Embodiments of the present invention provide methods for designing ophthalmic lenses, in which the topography of a lens is adapted to specific wavelengths by using an effective refraction index corresponding to the specific wavelengths to be viewed. These methods may be used, for example, for designing spectacle lenses suitable for specific uses, and/or for designing lenses with certain colors for esthetic reasons and/or reasons of fashion. These methods may also be used for any other suitable purpose. The methods according to embodiments of the present invention include calculation of an effective refraction index for the lens, based on factors such as parameters of the lens and/or the environment/environment conditions in which the lens is likely/preferably to be used.

The parameters of the lens and/or the environment which may affect the effective index of refraction of the lens according to embodiments of the present invention are parameters which may affect the spectrum of wavelengths which may be transmitted through the lens. As discussed above, the spectrum of wavelengths which may be transmitted through the lens may affect the refraction index of the lens.

Figure 2A:
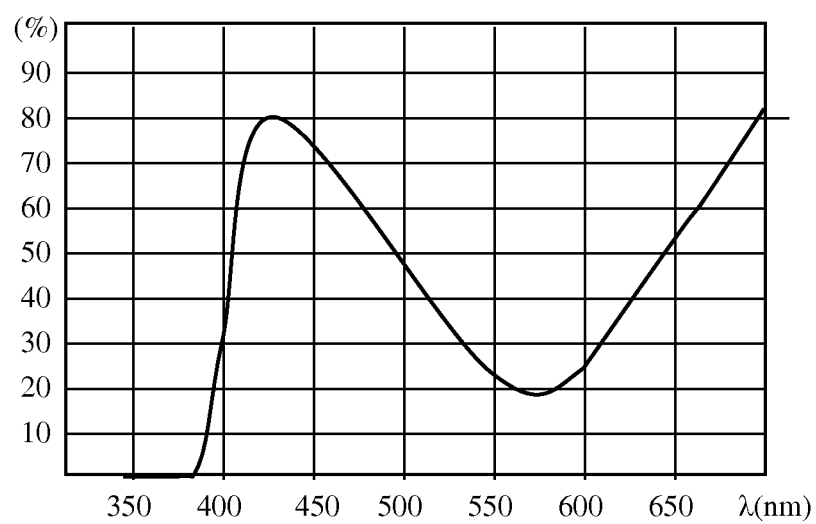
FIGS. 2A and 2B are schematic transmittance graphs illustrating transmittance functions (transmittance per wavelength) of two differently tinted lenses.
Figure 2B:
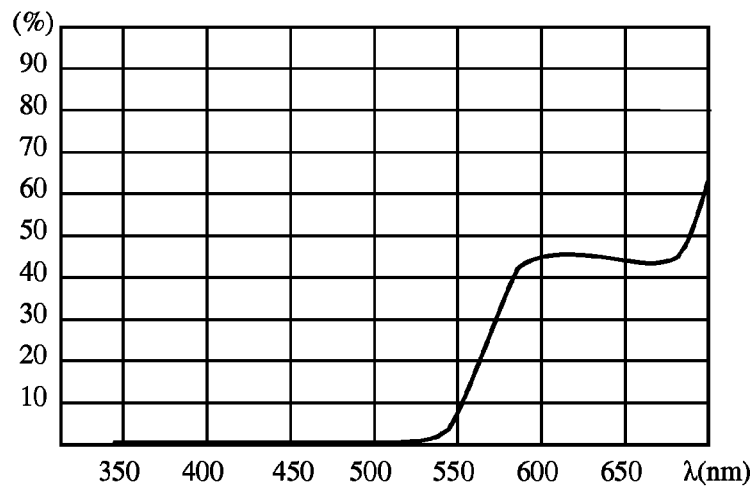

One factor which may affect the spectrum of wavelengths which may be transmitted through the lens, and thus the effective refraction index of the lens, is the tint and/or mirror coating of the lens. In some cases, the lenses may be tinted or/and mirror coated in certain colors, for example, for adaptation to a certain use or for esthetic reasons. For example, FIGS. 2A and 2B are schematic transmittance graphs illustrating transmittance functions (transmittance per wavelength) of two differently tinted lenses. The transmittance is defined as the ratio of the transmitted illumination intensity to the original illumination intensity. In the transmittance graphs of FIGS. 2A and 2B, the transmittance is presented in percents and the wavelength in nanometers. The graph of FIG. 2A, for example, shows transmittance function of blue-lilac tinted lenses, which blocks most of the green-yellow light. The graph of FIG. 2B, for example, shows transmittance function of yellow-orange-brown tinted lenses, which blocks most of the blue light.

Figure 3:
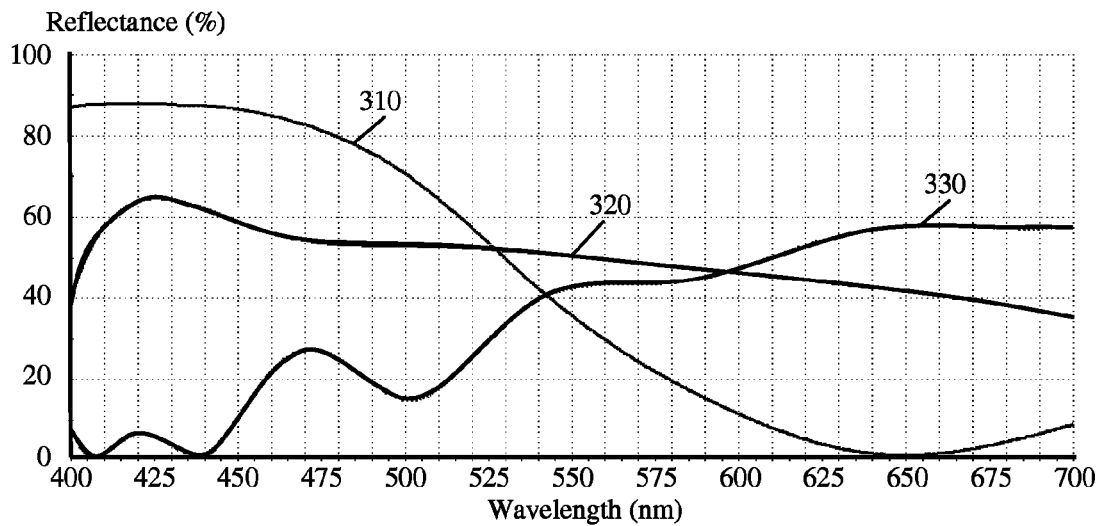
FIG. 3 is a diagram showing reflectance graphs illustrating reflectance functions (reflectance per wavelength) of three differently mirror-coated lenses.

For further example, FIG. 3 is a diagram showing reflectance graphs 310, 320 and 330 illustrating reflectance functions (reflectance per wavelength) of three differently mirror-coated lenses. Accordingly, graph 310 corresponds to a mirror-coating which blocks most of the blue light, graph 320 corresponds to a mirror-coating which partially blocks light of all wavelengths, and graph 330 corresponds to a mirror-coating which transmits most of the blue light and partially blocks light of other wavelengths.

The transmittance function of a lens may be denoted $T(\lambda)$ (transmittance per wavelength). For determining the total transmittance of a lens, one may calculate the integral $\int T(\lambda)d\lambda$ over the visual spectrum.

Another factor which may affect the spectrum of wavelengths which may be transmitted through the lens, and thus the effective refraction index of a lens may be the illumination spectrum in the viewed environment. In some cases, for example, the illumination sources illuminating the viewed environment may have colors with wavelengths substantially different than the wavelength correlated with the refractive index n* usually being used for calculating the optical power of the lens. Thus, in order to produce the accurate optical power the effective refraction index may be calculated. The relative illumination source spectrum intensity per wavelength may be denoted $I(\lambda)$, wherein $I(\lambda)$ may be defined so that the total intensity over the visual spectrum is $$\int_{400}^{700} I(\lambda)d\lambda = 1.$$

In some of the formulas and integral expressions shown below, the wavelength range of 400 nm to 700 nm being used, as this is, approximately, the range of the visual spectrum for humans. However, it will be appreciated that other ranges of wavelengths may be used when appropriate, according to the need. Whenever the wavelength range of 400 nm to 700 nm is being used and/or referred to in the present application, this will be regarded as an approximation of the range of the visual spectrum and not as a binding/obligatory range value.

Another factor which may affect the spectrum of wavelengths which may be transmitted through the lens, and thus the effective refraction index of a lens may be the emission spectrum of the objects to be viewed. In some cases, the objects being viewed through the spectacle lenses may have colors with wavelengths substantially different than the wavelength correlated with the refractive index n* usually being used for calculating the optical power of the lens. Thus, in order to produce the accurate optical power the effective refraction index may be calculated. The relative intensity of the emitted light from an object as a function of wave length may be denoted $O(\lambda)$, wherein $O(\lambda)$ may be defined so that the total emission over the visual spectrum $$\int_{400}^{700} O(\lambda)d\lambda = 1.$$

Therefore, the effective refraction index may be calculated, for example, at least based on a parameter of the lens/environment which may affect the spectrum of wavelengths which may be transmitted through the lens, such as, for example, $T(\lambda)$ and/or $I(\lambda)$ and/or $O(\lambda)$, according to the specific case. The combination of factors which may affect the spectrum of wavelengths which may be transmitted through the lens may create a transmission spectrum unique for the specific case. The effective refraction index may be calculated based on at least the unique transmission spectrum and the wavelength dependency of the index of refraction of the lens material.

Figure 4:
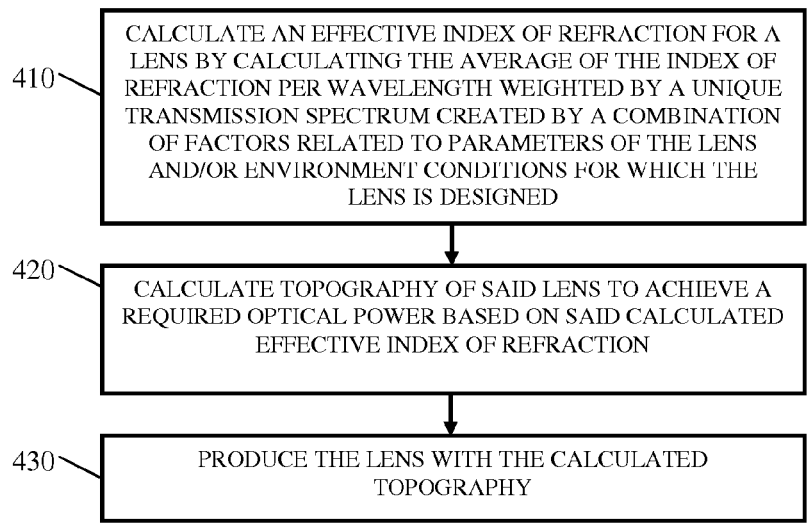
FIG. 4 is a flowchart illustrating a method for designing ophthalmic lens according to embodiments of the present invention

Reference is now made to FIG. 4, which is a flow chart illustrating a method for designing ophthalmic lens according to embodiments of the present invention. As shown in block 410, the method may include calculating an effective index of refraction for a lens by calculating the average of the index of refraction per wavelength weighted by the unique transmission spectrum created by a combination of factors related to parameters of the lens and/or the environment conditions for which the lens is designed. For example, if the unique transmission spectrum is denoted $S(\lambda)$, the effective index of refraction may be calculated by:

$$\bar{n} = \frac{\int_{400}^{700}(S(\lambda))n(\lambda)d\lambda}{\int_{400}^{700}(S(\lambda))d\lambda} \qquad \text{Equation 2}$$

wherein n̄ is the effective index of refraction being calculated. In cases, for example, when the unique transmission spectrum S(λ) is strongly biased to one side of the visual spectrum, and/or when the material of which the lens is being made is highly dispersive (i.e. the index of refraction changes significantly with the wavelength), the calculated effective refraction index n̄ may differ significantly from n*, and thus, for example, may affect considerably the required topography of the lens in order to achieve a certain optical power, relative to the topography of the lens required when performing the calculations based on n*.

Accordingly, as shown in block 420, the method may include calculating topography of the lens to achieve a required optical power based on the calculated effective index of refraction. The calculation of the required topography may be performed, for example, according to a known formula, for example by using the calculated effective refraction index n̄ instead of the index of refraction n* usually being used. As shown in block 430, the method may include producing the lens with the calculated topography.

Figure 5:
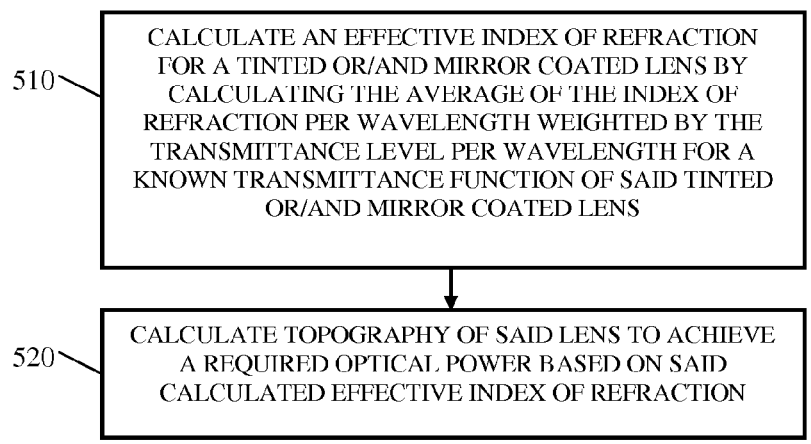
FIG. 5 is a flowchart illustrating a method for designing ophthalmic lens according to embodiments of the present invention.

Reference is now made to FIG. 5, which is a flow chart illustrating a method for designing ophthalmic lens according to embodiments of the present invention. The method illustrated in FIG. 5 may be useful, for example, for designing a tinted or/and mirror coated lens intended for viewing environment illuminated by substantially white light. The method illustrated in FIG. 5 may include calculating an effective index of refraction at least based on a known transmittance function of the tinted or/and mirror coated lens and a know wavelength dependency of the index of refraction of the lens material. Accordingly, as shown in block 510, the method may include calculating an effective index of refraction for a tinted lens by calculating the average of the index of refraction per wavelength weighted by the transmittance level per wavelength for a known transmittance function of the tinted or/and mirror coated lens.

For example, according to this embodiment of the invention, the calculation of the effective index of refraction for a tinted or/and mirror coated lens intended for viewing environment illuminated by substantially white light may be done by using the following formula:

$$\bar{n} = \frac{\int_{400}^{700}T(\lambda)n(\lambda)d\lambda}{\int_{400}^{700}T(\lambda)d\lambda} \qquad \text{Equation 3}$$

wherein n̄ is the effective index of refraction being calculated. In cases, for example, when the transmittance function T(λ) is strongly biased to one side of the spectrum, and/or when the material of which the lens is being made is highly dispersive (i.e. the index of refraction changes significantly with the wavelength), the calculated effective refraction index n̄ may differ significantly from n*, and thus, for example, may affect considerably the required topography of the lens in order to achieve a certain optical power, relative to the topography of the lens required when performing the calculations based on n*.

Accordingly, as shown in block 520, the method may include calculating topography of the tinted or/and mirror coated lens to achieve a required optical power based on the calculated effective index of refraction. The calculation of the required topography may be performed, for example, according to a known formula, for example by using the calculated effective refraction index n̄ instead of the index of refraction n* usually being used.

Figure 6:
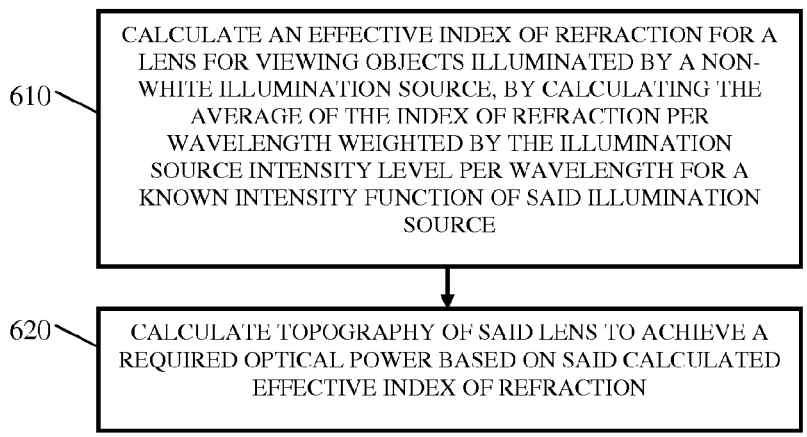
FIG. 6 is a flowchart illustrating a method for designing ophthalmic lens according to embodiments of the present invention.

Reference is now made to FIG. 6, which is a flow chart illustrating a method for designing ophthalmic lens according to embodiments of the present invention. The method illustrated in FIG. 6 may be useful, for example, for designing a substantially clear lens (e.g. which can transmit substantially all the visual spectrum) intended for viewing environment illuminated by non-white light. The method illustrated in FIG. 6 may include calculating an effective index of refraction at least based on a known illumination intensity function of the illumination source and a known wavelength dependency of the index of refraction of the lens material. Accordingly, as shown in block 610, the method may include calculating an effective index of refraction for a lens for viewing objects illuminated by a non-white illumination source, by calculating the average of the index of refraction per wavelength weighted by the illumination source intensity level per wavelength for a known intensity function of the illumination source.

For example, according to this embodiment of the invention, the calculation of the effective index of refraction for a substantially clear lens intended for viewing environment illuminated by non-white light may be done by using the following formula:

$$\bar{n} = \frac{\int_{400}^{700}I(\lambda)n(\lambda)d\lambda}{\int_{400}^{700}I(\lambda)d\lambda} \qquad \text{Equation 4}$$

wherein n̄ is the effective index of refraction being calculated. In cases, for example, when the intensity function I(λ) is strongly biased to one side of the spectrum, and/or when the material of which the lens is being made is highly dispersive (i.e. the index of refraction changes significantly with the wavelength), the calculated effective refraction index n̄ may differ significantly from n*, and thus, for example, may affect considerably the required topography of the lens in order to achieve a certain optical power, relative to the topography of the lens required when performing the calculations based on n*.

Accordingly, as shown in block 620, the method may include calculating topography of the lens to achieve a required optical power based on the calculated effective index of refraction. The calculation of the required topography may be performed, for example, according to a known formula, for example by using the calculated effective refraction index n̄ instead of the index of refraction n* usually being used.

Figure 7:
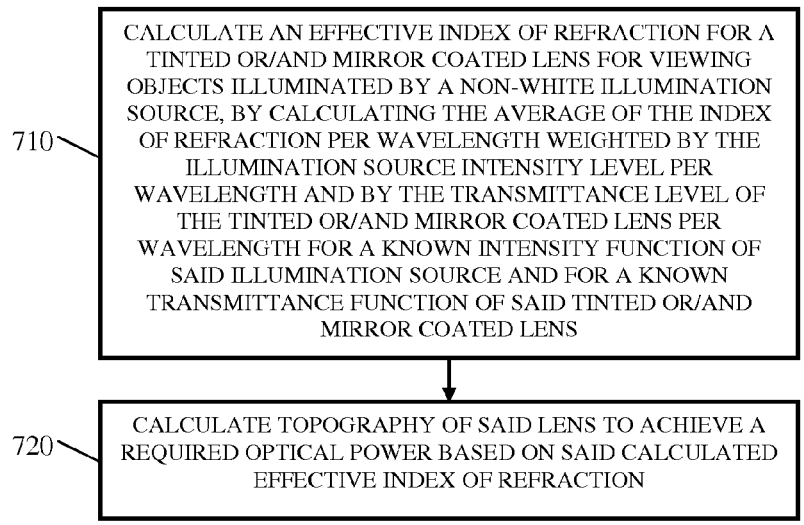
FIG. 7 is a flow chart illustrating a method for designing ophthalmic lens according to embodiments of the present invention.

Reference is now made to FIG. 7, which is a flow chart illustrating a method for designing ophthalmic lens according to embodiments of the present invention. The method illustrated in FIG. 7 may be useful, for example, for designing a tinted lens intended for viewing environment illuminated by non-white light. The method illustrated in FIG. 7 may include calculating an effective index of refraction at least based on a known illumination intensity function of the illumination source, a known transmittance function of the tinted or/and mirror coated lens and a know wavelength dependency of the index of refraction of the lens material. Accordingly, as shown in block 710, the method may include calculating an effective index of refraction for a tinted or/and mirror coated lens for viewing objects illuminated by a non-white illumination source, by calculating the average of the index of refraction per wavelength weighted by the illumination source intensity level per wavelength and by the transmittance level of the tinted lens per wavelength for a known intensity function of the illumination source and for a known transmittance function of the tinted or/and mirror coated lens.

For example, according to this embodiment of the invention, the calculation of the effective index of refraction for a tinted or/and mirror coated lens intended for viewing environment illuminated by non-white light may be done by using the following formula:

$$\bar{n} = \frac{\int_{400}^{700} T(\lambda)I(\lambda)n(\lambda)d\lambda}{\int_{400}^{700} T(\lambda)I(\lambda)d\lambda} \qquad \text{Equation 5}$$

wherein $\bar{n}$ is the effective index of refraction being calculated. In cases, for example, when the combination of the intensity function $I(\lambda)$ and the transmittance function $T(\lambda)$ generate an effective transmission spectrum which is strongly biased to one side of the spectrum, and/or when the material of which the lens is being made is highly dispersive (i.e. the index of refraction changes significantly with the wavelength), the calculated effective refraction index $\bar{n}$ may differ significantly from n*, and thus, for example, may affect considerably the required topography of the lens in order to achieve a certain optical power, relative to the topography of the lens required when performing the calculations based on n*.

Accordingly, as shown in block 720, the method may include calculating topography of the lens to achieve a required optical power based on the calculated effective index of refraction. The calculation of the required topography may be performed, for example, according to a known formula, for example by using the calculated effective refraction index $\bar{n}$ instead of the index of refraction n* usually being used.

Figure 8:
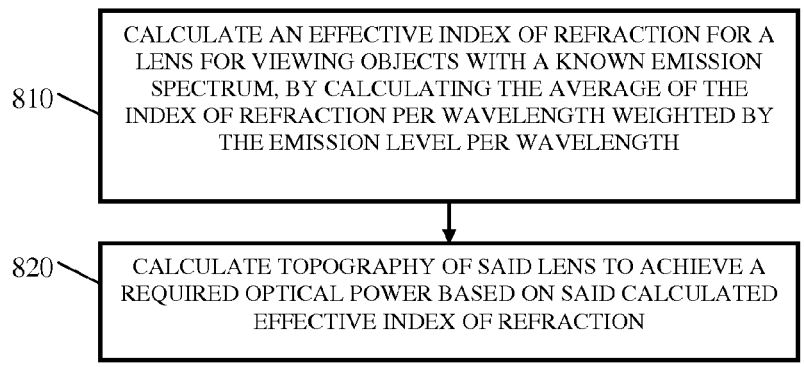
FIG. 8 is a flowchart illustrating a method for designing ophthalmic lens according to embodiments of the present invention.

Reference is now made to FIG. 8, which is a flow chart illustrating a method for designing ophthalmic lens according to embodiments of the present invention. The method illustrated in FIG. 8 may be useful, for example, for designing a lens intended for viewing objects and/or environment with a known emission spectrum. The method illustrated in FIG. 8 may include calculating an effective index of refraction at least based on a known emission function of the object/environment to be viewed by the lens and a know wavelength dependency of the index of refraction of the lens material. Accordingly, as shown in block 810, the method may include calculating an effective index of refraction for a lens for viewing objects/environments with a known emission spectrum, by calculating the average of the index of refraction per wavelength weighted by the emission level per wavelength.

For example, according to this embodiment of the invention, the calculation of the effective index of refraction for a substantially clear lens intended for viewing objects/environments with a known emission spectrum may be done by using the following formula:

$$\bar{n} = \frac{\int_{400}^{700} O(\lambda)n(\lambda)d\lambda}{\int_{400}^{700} O(\lambda)d\lambda} \qquad \text{Equation 6}$$

wherein $\bar{n}$ is the effective index of refraction being calculated. In cases, for example, when the emission function $O(\lambda)$ is strongly biased to one side of the spectrum, and/or when the material of which the lens is being made is highly dispersive (i.e. the index of refraction changes significantly with the wavelength), the calculated effective refraction index $\bar{n}$ may differ significantly from n*, and thus, for example, may affect considerably the required topography of the lens in order to achieve a certain optical power, relative to the topography of the lens required when performing the calculations based on n*.

Accordingly, as shown in block 820, the method may include calculating topography of the lens to achieve a required optical power based on the calculated effective index of refraction. The calculation of the required topography may be performed, for example, according to a known formula, for example by using the calculated effective refraction index $\bar{n}$ instead of the index of refraction n* usually being used.

In similar manner to the described above, one can calculate, according to embodiments of the present invention, an effective index of refraction for a substantially clear lens for viewing an object/environment with a known emission spectrum illuminated by a non-white Illumination source, by calculating the average of the index of refraction per wavelength weighted by the Illumination source intensity level per wavelength and by the emission level of the object/environment per wavelength for a known intensity function of the Illumination source and for a known emission function of the objects/environments, for example, by using the formula:

$$\bar{n} = \frac{\int_{400}^{700} (I(\lambda)O(\lambda))n(\lambda)d\lambda}{\int_{400}^{700} (I(\lambda)O(\lambda))d\lambda} \qquad \text{Equation 7}$$

wherein $\bar{n}$ is the effective index of refraction being calculated. The calculated effective index of refraction may than be used for calculating a topography of the lens.

Additionally, in similar manner to the described above, one can calculate, according to embodiments of the present invention, an effective index of refraction for a tinted or/and mirror coated lens for viewing an object/environment with a known emission spectrum illuminated by a substantially white Illumination source, by calculating the average of the index of refraction per wavelength weighted by the tinted lens transmittance level per wavelength and by the emission level of the object/environment per wavelength for a known transmittance function of the tinted or/and mirror coated lens and for a known emission function of the objects/environments, for example, by using the formula:

$$\bar{n} = \frac{\int_{400}^{700} (T(\lambda)O(\lambda))n(\lambda)d\lambda}{\int_{400}^{700} (T(\lambda)O(\lambda))d\lambda} \qquad \text{Equation 8}$$

wherein $\bar{n}$ is the effective index of refraction being calculated. The calculated effective index of refraction may than be used for calculating a topography of the lens.

Figure 9:
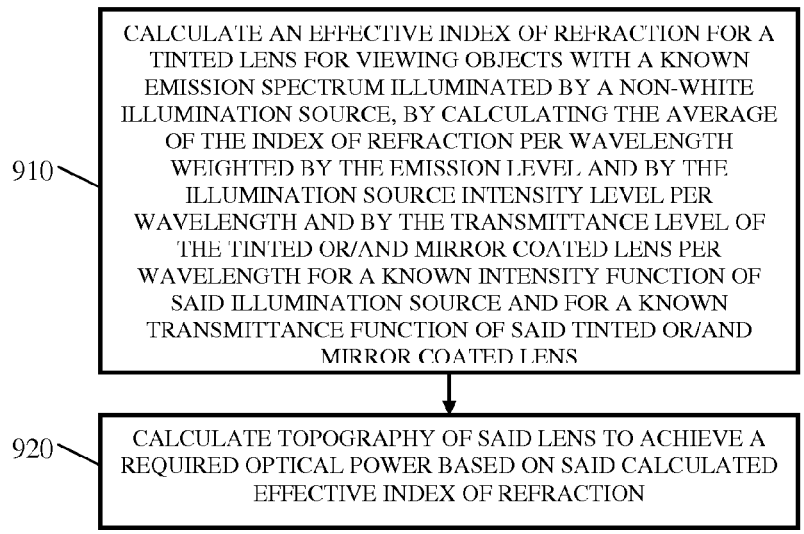
FIG. 9 is a flowchart illustrating a method for designing ophthalmic lens according to embodiments of the present invention.

In a more general case, one may design, according to embodiments of the present invention, a tinted or/and mirror coated lens for viewing an object/environment with a known emission spectrum illuminated by a non-white light source. This may be performed, for example, by the method illustrated in FIG. 9. The method illustrated in FIG. 9 may include calculating an effective index of refraction at least based on a known illumination intensity function of the illumination source, a known transmittance function of the tinted or/and mirror coated lens, a known emission function of the object/environment to be viewed and a known wavelength dependency of the index of refraction of the lens material. Accordingly, as shown in block 910, the method may include calculating an effective index of refraction for a tinted or/and mirror coated lens for viewing objects with a known emission spectrum illuminated by a non-white Illumination source, by calculating the average of the index of refraction per wavelength weighted by the emission level of the object to be viewed and by the Illumination source intensity level per wavelength and by the transmittance level of the tinted or/and mirror coated lens per wavelength for a known intensity function of said Illumination source and for a known transmittance function of said tinted or/and mirror coated lens.

For example, according to this embodiment of the invention, the calculation of the effective index of refraction for a tinted or/and mirror coated lens intended for viewing an object/environment with a known emission spectrum illuminated by non-white light may be done by using the following formula:

$$\bar{n} = \frac{\int_{400}^{700} (T(\lambda)I(\lambda)O(\lambda))n(\lambda)d\lambda}{\int_{400}^{700} (T(\lambda)I(\lambda)O(\lambda))d\lambda} \quad \text{Equation 9}$$

wherein $\bar{n}$ is the effective index of refraction being calculated. In cases, for example, when the combination of the intensity function $I(\lambda)$, the emission function $O(\lambda)$ and the transmittance function $T(\lambda)$ generate an effective transmittance spectrum which is strongly biased to one side of the spectrum, and/or when the material of which the lens is being made is highly dispersive (i.e. the index of refraction changes significantly with the wavelength), the calculated effective refraction index $\bar{n}$ may differ significantly from $n^*$, and thus, for example, may affect considerably the required topography of the lens in order to achieve a certain optical power, relative to the topography of the lens required when performing the calculations based on $n^*$.

Accordingly, as shown in block 920, the method may include calculating topography of the lens to achieve a required optical power based on the calculated effective index of refraction. The calculation of the required topography may be performed, for example, according to a known formula, for example by using the calculated effective refraction index $\bar{n}$ instead of the index of refraction $n^*$ usually being used.

Figure 10:
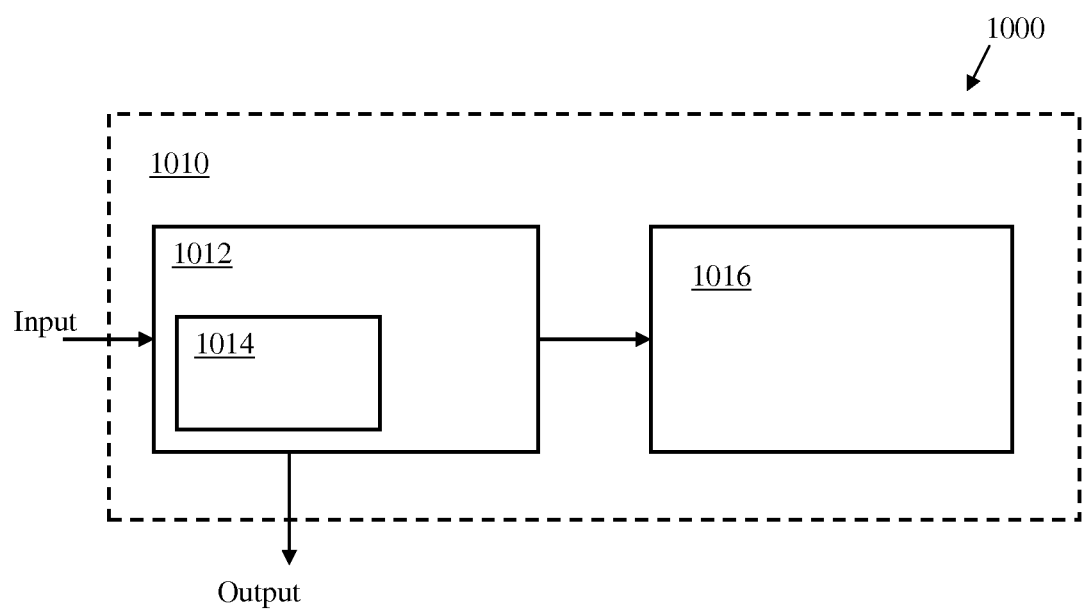
FIG. 10 is a schematic illustration of a system for designing ophthalmic lens according to embodiments of the present invention.

The method described above with reference to FIGS. 4-9 may be executed by a system provided according to some embodiments of the present invention. Reference is now made to FIG. 10, which is a schematic illustration of a system 1000 for designing ophthalmic lens according to embodiments of the present invention. System 1000 may include a processor 1012, a non-transitory processor-readable storage medium 1014 and a lens processing unit 1016. Non-transitory processor-readable storage medium 1014 may have stored thereon instructions for processor 1012. Processor 1012 may receive input such as, for example, wavelength dependency of the index of refraction of a lens material, parameters of the lens, environment conditions and/or any factor which may affect a transmission spectrum of the lens.

Processor 1012, for example further to instructions read from storage medium 1014 and executed by processor 1012, may calculate an effective refraction index of a lens based on the wavelength dependency of the index of refraction of the lens material and based on a unique transmission spectrum created by at least one factor related to parameters of at least one of the lens and environment conditions, for example as discussed above with reference to FIGS. 4-9. Based on the calculated effective index of refraction, processor 1012, for example further to instructions read from storage medium 1014 and executed by processor 1012, may calculate topography of the lens to achieve a required optical power, for example as discussed above with reference to FIGS. 4-9. The calculated topography may be outputted for further processing and/or communicated to lens processing unit 1016. The calculated topography may be communicated directly to lens processing unit 1016, for example, by a wired or wireless communication link. The calculated topography may be communicated to processing unit 1016 together with instructions to produce the lens with the calculated topography. Alternatively, instructions to produce the lens with the calculated topography may be received by lens processing unit 1016 from another processor, controller and/or from a user. Lens processing unit 1016 may produce the lens with the calculated topography, for example, further to the received instructions.

Additionally and/or alternatively, the calculated topography may be outputted to a receiver, another processor, a printer, a display and/or any other suitable destination. In some embodiments a user, controller and/or another processor may communicate the calculated topography to lens processing unit 1016, for example together with instructions to produce the lens with the calculated topography.

In some cases, in addition to the topography calculated to achieve a required optical power based on the calculated effective index of refraction, processor 1012 may output additional values, such as for example, the optical power that the resulting lens with the calculated topography may have under other conditions, e.g. in cases when the effective index of refraction is different from the calculated effective index of refraction. This may be useful, for example, when the lens is being examined under other conditions than the conditions for which the lens is made.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for designing spectacles lenses, the method comprising:
   receiving as input the wavelength dependency of the index of refraction of a certain lens material of a spectacles lens to be produced for a certain patient's prescription, and a parameter regarding a feature of the lens affecting a unique transmission spectrum of the lens;
   calculating an effective refraction index of said lens corresponding to a specific wavelengths to be viewed weighted by the affected unique transmission spectrum of the lens and based on the wavelength dependency of the index of refraction of the lens material;
   calculating a topography of said lens to achieve a certain patient's prescription, the topography of a lens is adapted to said specific wavelengths by using in the topography calculation said effective refraction index that corresponds to the specific wavelengths to be viewed; and
   producing said lens with said calculated topography.

2. A method according to claim 1, wherein said calculating an effective refraction index comprises calculating an average of the index of refraction per wavelength weighted by said unique transmission spectrum.

3. A method according to claim 1, wherein said parameter regarding a feature of the lens comprises transmittance of the lens per wavelength.

4. A method according to claim 3, wherein transmittance of the lens per wavelength is affected by at least one of a colored tint or a colored mirror coating.

5. A method according to claim 4, wherein the lens is tinted or mirror coated, and wherein said calculating an effective refraction index comprises calculating an average of the index of refraction per wavelength weighted by a transmittance level per wavelength for a known transmittance function of the tinted or mirror lens.

6. A method according to claim 4, wherein the lens is a tinted or mirror coated and is for viewing objects illuminated by a non-white illumination source, and wherein said calculating an effective refraction index comprises calculating an average of the index of refraction per wavelength weighted by the illumination source intensity level per wavelength and by a transmittance level of the tinted or mirror coated lens per wavelength for a known intensity function of the illumination source and for a known transmittance function of the tinted or mirror coated lens.

7. A method according to claim 4, wherein the lens is a tinted or mirror coated and is for viewing objects with a known emission spectrum, and wherein said calculating an effective refraction index comprises calculating an average of the index of refraction per wavelength weighted by the emission level per wavelength and by a transmittance level of the tinted or mirror coated lens per wavelength for a known transmittance function of the tinted or mirror coated lens.

8. A method according to claim 4, wherein the lens is a tinted or mirror coated and is for viewing objects with a known emission spectrum illuminated by a non-white illumination source, and wherein said calculating an effective refraction index comprises calculating an average of the index of refraction per wavelength weighted by the emission level per wavelength and by the transmittance level of the tinted or mirror coated lens per wavelength and by the illumination source intensity level per wavelength for a known intensity function of the illumination source and for a known transmittance function of the tinted or mirror coated lens.

9. A system for designing spectacles lenses, the system comprising:
a processor to:
receive as input the wavelength dependency of the index of refraction of a certain lens material of a spectacles lens to be produced for a certain patient's prescription, and a parameter regarding a feature of the lens affecting a unique transmission spectrum of the lens;
calculate an effective refraction index of said lens corresponding to a specific wavelengths to be viewed weighted by the affected unique transmission spectrum of the lens and based on the wavelength dependency of the index of refraction of the lens material; and
calculate a topography of said lens to achieve a certain patient's prescription, the topography of a lens is adapted to said specific wavelengths by using in the topography calculation said effective refraction index that corresponds to the specific wavelengths to be viewed; and
a lens processing unit to produce said lens with said calculated topography.

10. A non-transitory processor-readable storage medium having instructions stored thereon that, when executed by a processor, result in:
receiving as input the wavelength dependency of the index of refraction of a certain lens material of a spectacles lens to be produced for a certain patient's prescription, and a parameter regarding a feature of the lens affecting a unique transmission spectrum of the lens;
calculating an effective refraction index of said lens corresponding to a specific wavelengths to be viewed weighted by the affected unique transmission spectrum of the lens and based on the wavelength dependency of the index of refraction of the lens material;
calculating a topography of said lens to achieve a certain patient's prescription, the topography of a lens is adapted to said specific wavelengths by using in the topography calculation said effective refraction index that corresponds to the specific wavelengths to be viewed; and
producing said lens with said calculated topography.

11. A non-transitory processor-readable storage medium according to claim 10, wherein when executed by a processor, the instructions further result in: said calculating an effective refraction index comprises calculating an average of the index of refraction per wavelength weighted by said unique transmission spectrum.

12. A non-transitory processor-readable storage medium according to claim 10, wherein said parameter regarding a feature of the lens comprises transmittance of the lens per wavelength.

13. A non-transitory processor-readable storage medium according to claim 12, wherein transmittance of the lens per wavelength is affected by at least one of a colored tint or a colored mirror coating.

14. A non-transitory processor-readable storage medium according to claim 13, wherein the lens is tinted or mirror coated, and wherein when executed by a processor, the instructions further result in: said calculating an effective refraction index comprises calculating an average of the index of refraction per wavelength weighted by a transmittance level per wavelength for a known transmittance function of the tinted or mirror lens.

15. A non-transitory processor-readable storage medium according to claim 13, wherein the lens is a tinted or mirror coated and is for viewing objects illuminated by a non-white illumination source, and wherein when executed by a processor, the instructions further result in: said calculating an effective refraction index comprises calculating an average of the index of refraction per wavelength weighted by the illumination source intensity level per wavelength and by a transmittance level of the tinted or mirror coated lens per wavelength for a known intensity function of the illumination source and for a known transmittance function of the tinted or mirror coated lens.

16. A non-transitory processor-readable storage medium according to claim 13, wherein the lens is a tinted or mirror coated and is for viewing objects with a known emission spectrum, and wherein when executed by a processor, the instructions further result in: said calculating an effective refraction index comprises calculating an average of the index of refraction per wavelength weighted by the emission level per wavelength and by a transmittance level of the tinted or mirror coated lens per wavelength for a known transmittance function of the tinted or mirror coated lens.

17. A non-transitory processor-readable storage medium according to claim 13, wherein the lens is a tinted or-mirror coated and is for viewing objects with a known emission spectrum illuminated by a non-white illumination source, and wherein when executed by a processor, the instructions further result in: said calculating an effective refraction index comprises calculating an average of the index of refraction per wavelength weighted by the emission level per wavelength and by the transmittance level of the tinted or mirror coated lens per wavelength and by the illumination source intensity level per wavelength for a known intensity function of the illumination source and for a known transmittance function of the tinted or mirror coated lens.

* * * * *